Sept. 9, 1947.  L. GESS  2,427,131

SIGNAL SYSTEM FOR MEASURING INSTRUMENTS

Filed May 2, 1945  5 Sheets-Sheet 1

INVENTOR.
LOUIS GESS

BY
*C. B. Hangenberg*
ATTORNEY.

*INVENTOR.*
LOUIS GESS
BY
ATTORNEY

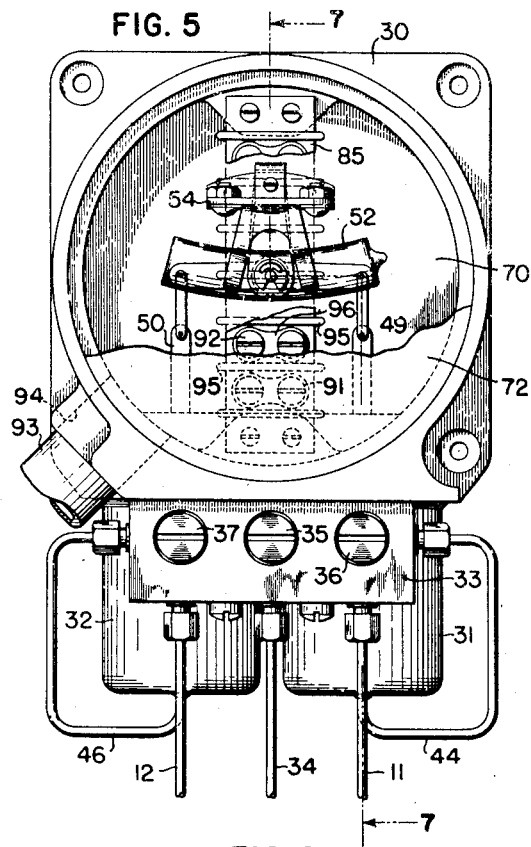
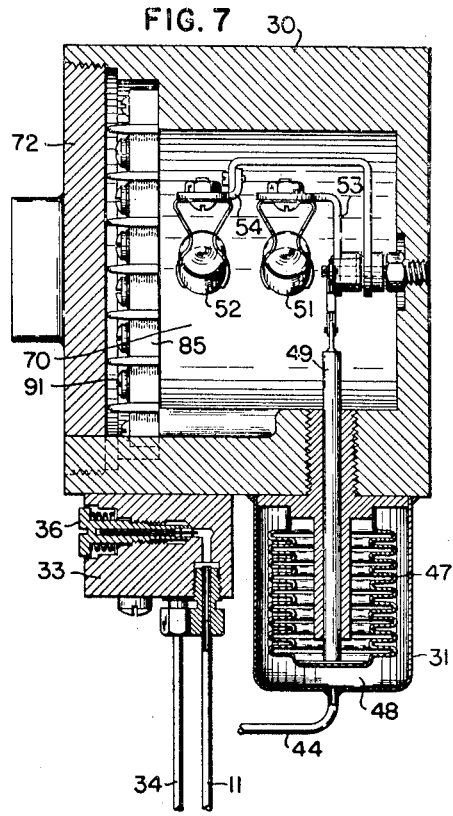
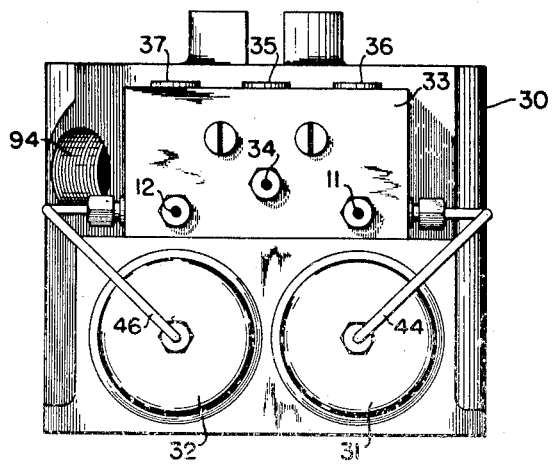

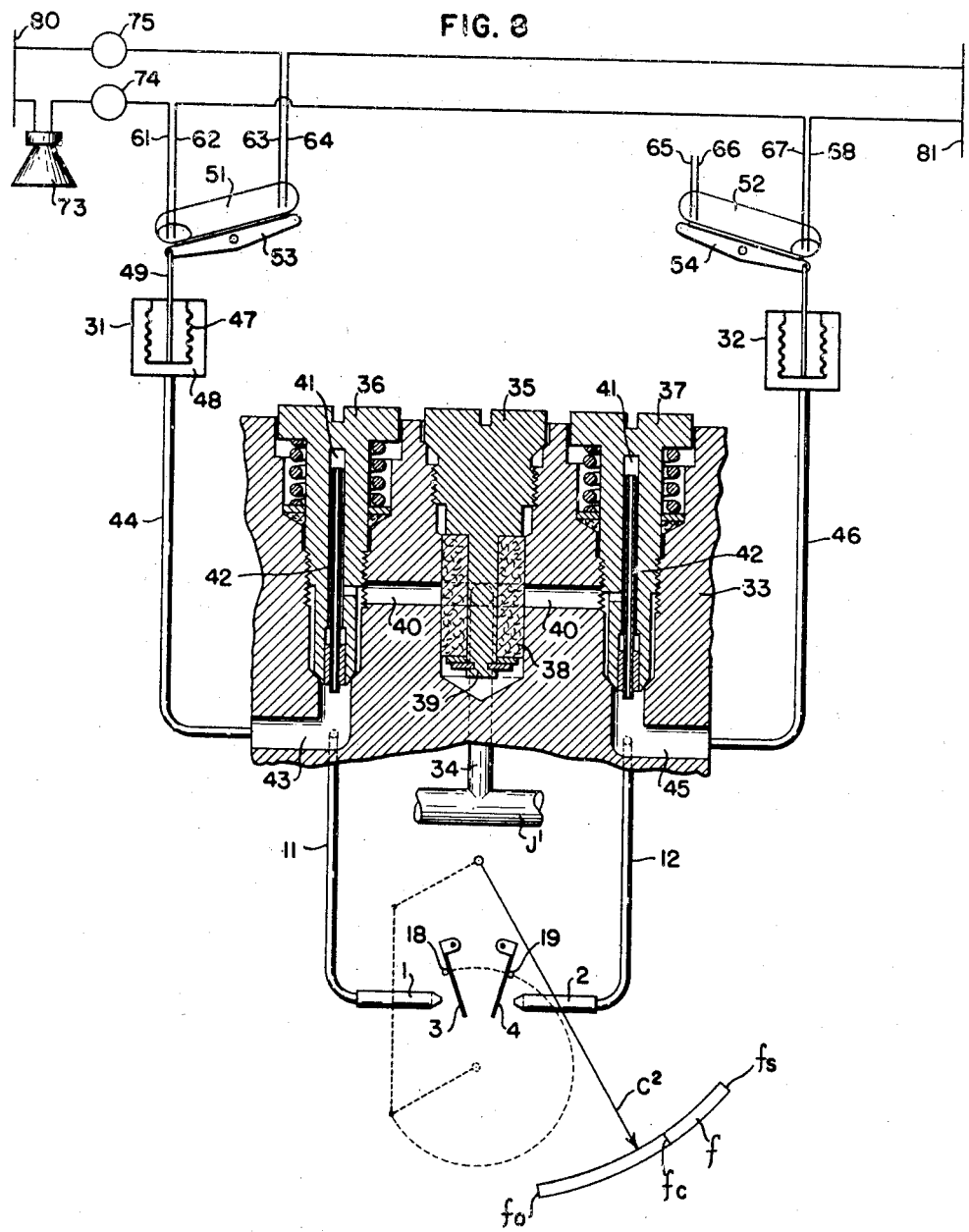

Sept. 9, 1947.　　　　　L. GESS　　　　　2,427,131
SIGNAL SYSTEM FOR MEASURING INSTRUMENTS
Filed May 2, 1945　　　5 Sheets-Sheet 5
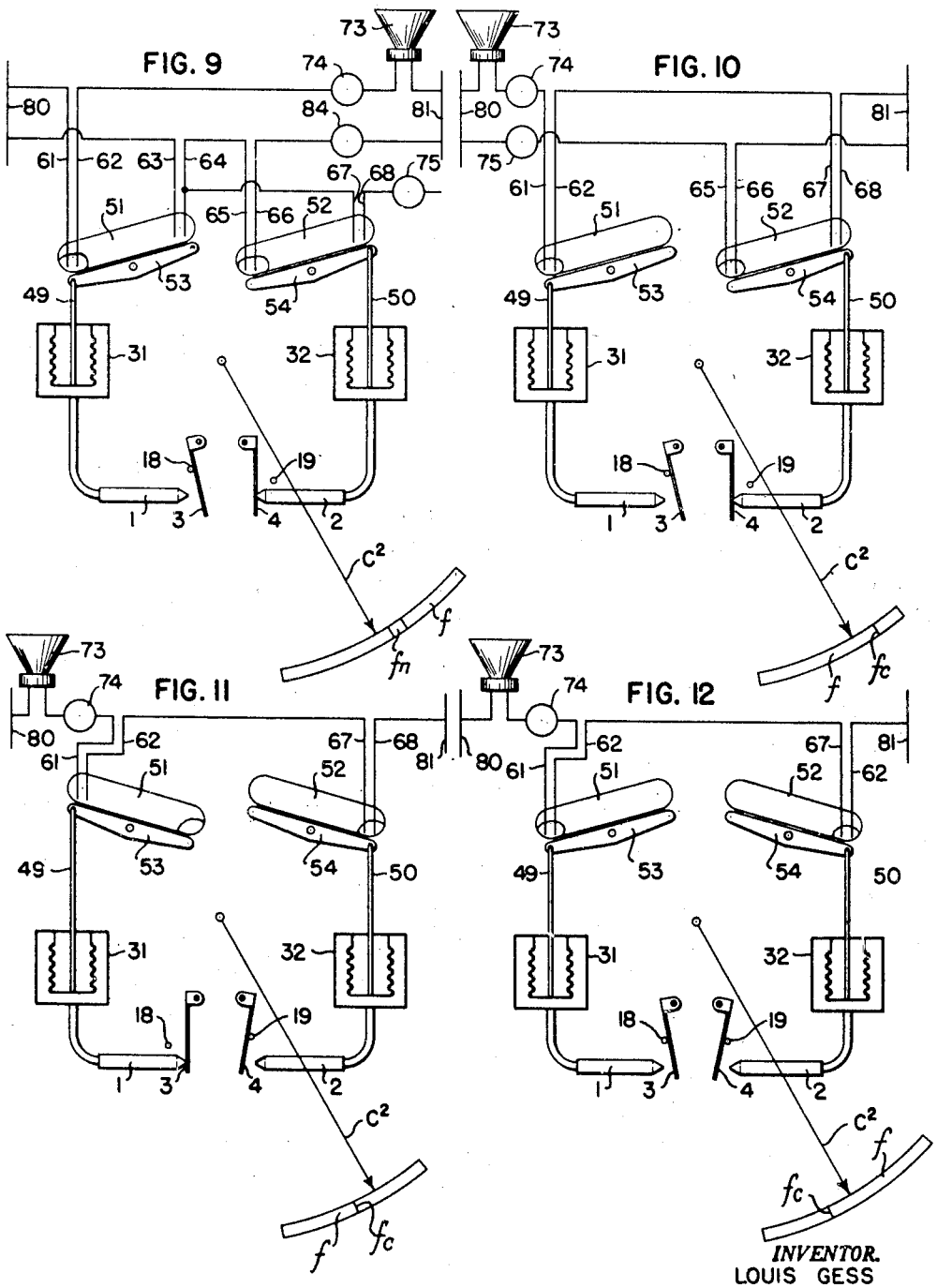
INVENTOR.
LOUIS GESS
BY
C. B. Spangenberg
ATTORNEY.

Patented Sept. 9, 1947

2,427,131

UNITED STATES PATENT OFFICE 2,427,131

SIGNAL SYSTEM FOR MEASURING INSTRUMENTS

Louis Gess, Jenkintown, Pa., assignor to The Brown Instrument Company, Philadelphia, Pa., a corporation of Pennsylvania Application May 2, 1945, Serial No. 591,491

15 Claims. (Cl. 171—97)

The general object of the present invention is to provide improved air control apparatus, and in particular to provide a control instrument including a plurality of control elements with novel and effective pneumatic actuating mechanism for operating different control elements in response to changes in a common controlling condition.

One specific object of the invention is to provide an air control instrument of commercial type with simple and effective air actuated mechanism for actuating electric switches.

Another specific object of the invention is to provide an air control instrument with electric switches so disposed and actuated as to avoid the fire and explosion risk existing in oil refinery and other installations in which the atmosphere enveloping the instrument includes inflammable gases and vapors which may be ignited by an electric spark.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Of the drawings:

Fig. 5 is a rear elevation of a switch mechanism unit shown in Fig. 4;

Fig. 6 is an inverted plan view of the unit shown in Fig. 5;

Fig. 7 is a section on the broken line of 7—7 of Fig. 5;

Fig. 8 is a diagram showing one control system including the mechanism shown in Figs. 1–7; and Figs. 9–12 are diagrams each illustrating a different modification of the control system shown in Fig. 8.

Figure 1:
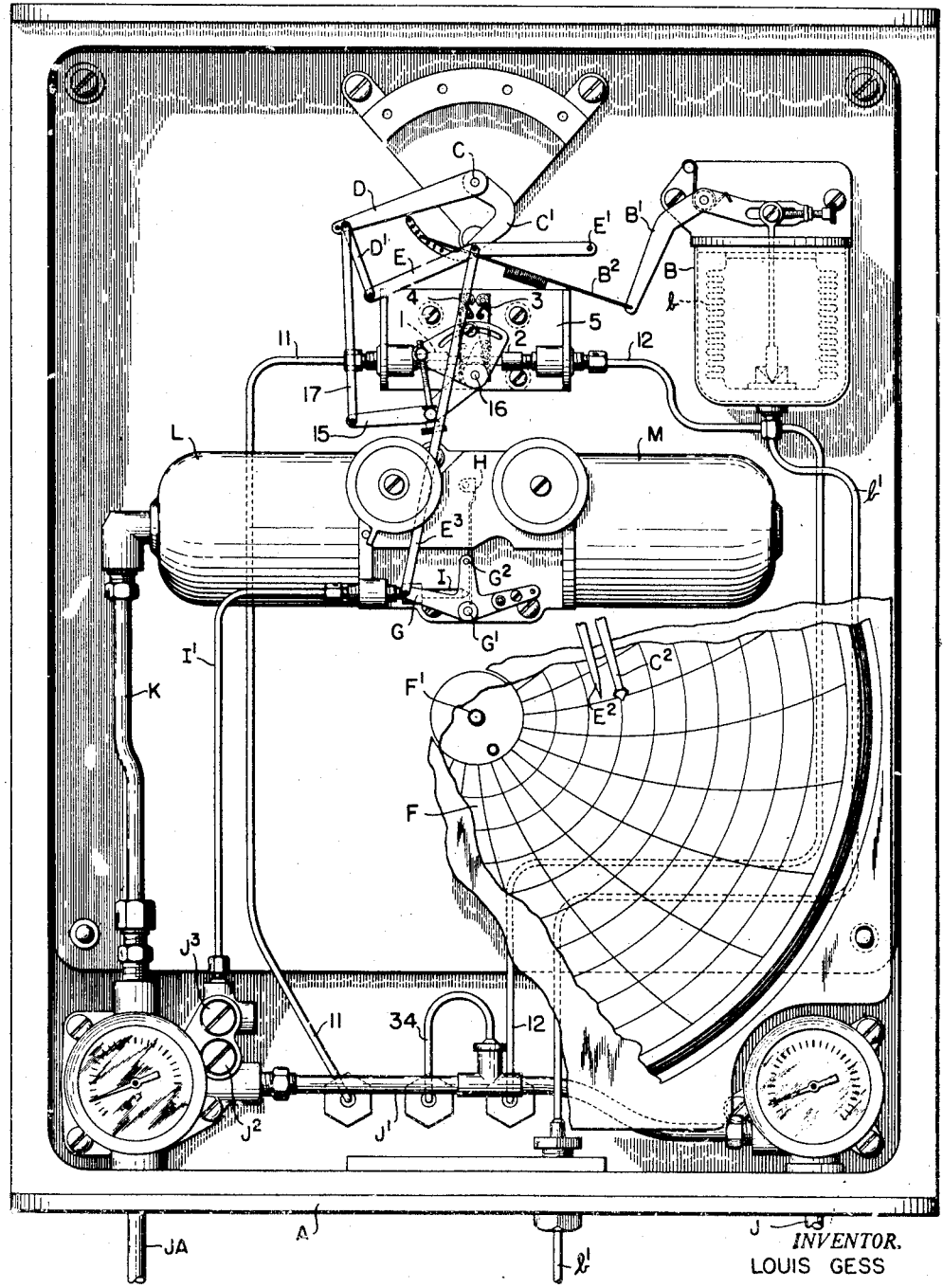
Fig. 1 is a front elevation of an air control instrument with parts broken away and removed.

In the drawings, I have illustrated, by way of example, an embodiment of my invention including an air control instrument A of a well known and widely used commercial type. The instrument A comprises an instrument casing having a front door A', and including an element B responsive to a controlling condition. As shown, the element B includes a bellows $b$ which contracts and expands in response to variations in a controlling pressure transmitted to the element B by a capillary tube $b'$. The latter may be connected to the bulb of a fluid pressure thermometer, or other source of a fluid pressure varying with changes in some controlling condition, such as a temperature, a pressure, or a velocity. The expansion and contraction of bellows $b$ give clockwise and counter-clockwise adjustments, respectively, to a lever B' having one arm connected to the movable end of bellows $b$. The opposite arm of the lever B' is connected by a link $B^2$ to an arm C' carried by a pen shaft C which is journalled in the instrument casing and oscillated by the angular adjustments of the lever B'. The pen shaft C carries a pen arm $C^2$, of which all but the lower portion is broken away in Fig. 1.

The pen shaft C also carries a control arm D. The free end of the arm D is connected by a link D' to one end of a lever E. The other end of the lever E is connected to a fulcrum pivot E'. The latter is normally stationary, but is subject to adjustment by control point adjusting means which may be of known type, and need not be shown or described herein. A record of the varying value of the controlling condition is made by the pen arm $C^2$ on a record chart F rotated by a chart driving shaft F". An index $E^2$, of which a portion only is shown in Fig. 1, is angularly adjusted as the fulcrum E' is adjusted, to indicate on the record chart F, the value of the controlling condition which the instrument A tends to maintain by its adjustment of a regulator (not shown) to which the instrument transmits a controlling pressure.

Intermediate its ends, the lever E is connected to the upper end of a link $E^3$. The lower end of link $E^3$ is connected to a lever G having a movable fulcrum pivot G'. The lever G is angularly adjusted about the pivot G', by longitudinal adjustments of the link $E^3$, and is also operatively adjusted by lateral adjustments of the fulcrum G'. The lever G operates through a pin $G^2$ to cause a flapper valve H to move toward and away from a bleed nozzle I as the lever is adjusted. The bleed nozzle I is connected to a pipe J which supplies air under a suitable pressure to the instrument A, by connecting means comprising a pipe J', a filter element $J^2$, an element $J^3$ including a restricted orifice, and a pipe I'. The adjustment of the flapper valve H toward and away from the nozzle I increases and decreases the pressure at the outlet side of the restricted orifice element $J^3$.

In the known type of the instrument shown, the pressure in the pipe I' is transmitted to a booster or pilot valve (not shown) which maintains a relay pressure proportional to the pressure in the nozzle pipe I'. The relay pressure is transmitted by a pipe K to a follow-up element L, and also to a pipe JA running to the previously mentioned regulator (not shown). The latter may take various forms, but is usually a diaphragm motor valve. The follow-up element L and an associated reset or compensating element M effect predetermined adjustments of the position of the fulcrum G' for the lever G, following adjustments of the flapper H and the resultant change in the control pressure. The instrument A insofar as already described, operates to effect a graduated or proportional control. With such control, the regulator controlled by the pressure transmitted through the pipe JA is adjusted gradually between its extreme positions as the value of the controlling condition varies through a considerable range of values and thereby turns the pen shaft C through a corresponding range of values. In respect to its specific features of construction and operation already described, the instrument A includes nothing claimed as novel herein, but on the contrary is of the known type disclosed in the Moore Patent 2,125,081, granted July 26, 1938.

Figure 2:
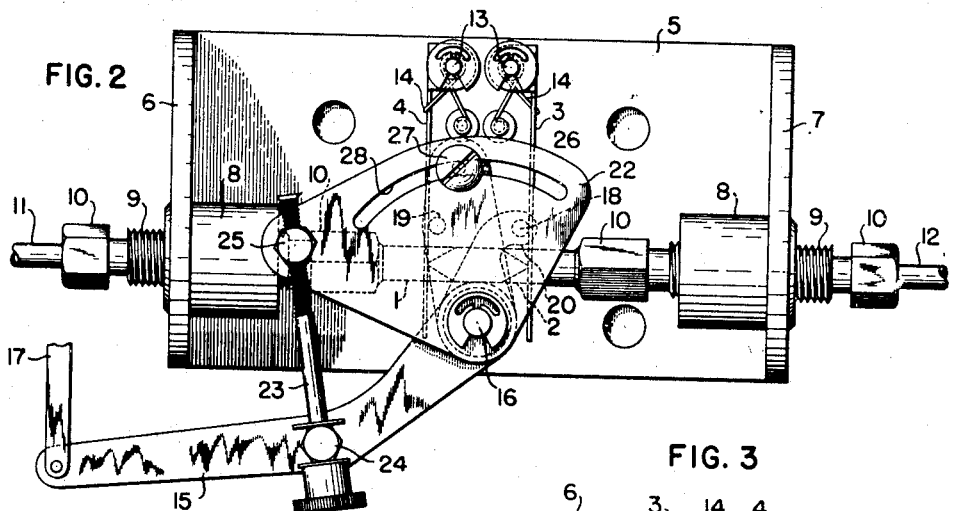
Fig. 2 is a reproduction on a larger scale, of a portion of the apparatus shown in Fig. 1.

In the embodiment of the present invention shown in the drawings, the operation of the responsive element B which adjusts the pen arm $C^2$ and produces the above mentioned graduated or proportional control effect, also actuates novel mechanism, now to be described, for producing supplemental or auxiliary control effects. Those effects need not be, and ordinarily are not of the graduated or proportional type. Said novel control mechanism, in the preferred form shown by way of example in the drawings, comprises a pair of bleed nozzles 1 and 2, a pair of flapper valves 3 and 4, and means through which the flapper 3 is caused to approach and move away from the nozzle 1 and the flapper 4 is caused to simultaneously move away from and toward the nozzle 2. The flappers 3 and 4 thus control the air pressure in nozzles 1 and 2 respectively. An adjustment of the pen arm $C^2$ which results in a movement of the flapper 3 toward the nozzle 1, results in a movement of the flapper 4 away from the nozzle 2. For the purposes of the present invention, it is desirable that the position of each of the flappers 3 and 4 relative to the corresponding nozzle 1 or 2, when the pen arm $C^2$ is in a particular angular position, should be readily subject to suitable adjustments. To facilitate such adjustments and the proper mounting of the nozzle flapper and flapper operating parts, I advantageously employ the auxiliary nozzle and flapper assembly which I have devised for the purpose, and which is shown in detail in Figs. 2 and 3.

In that assembly, the nozzles 1 and 2 are mounted in the transverse end flanges 6 and 7 of a bracket part 5. The latter is detachably secured to the back wall of the instrument casing A. The nozzle 1 is connected by a coupling or union 10, to an externally threaded pipe section 9, which extends through and is in threaded engagement with a tubular part 8 anchored at one end to the flange 6 of the bracket 5. The end of the pipe section 9 remote from the nozzle is connected by a second coupling or union 10 to a pipe 11. The nozzle 1 may thus be given longitudinal adjustments by rotating the pipe section 9 in its support 8. The nozzle 2 is connected to a pipe 12 and is supported by means of parts 8, 9 and 10 similar to the similarly designated parts associated with the nozzle 1. Conveniently and as shown, the nozzles 1 and 2 are laterally displayed from one another and overlap, so that the flapper 4 may be farther from the flange 7, and nearer to the flange 6, than is the flapper 3. Each of the flappers 3 and 4 is mounted on a corresponding post 13 anchored at one end to the bracket 5. Each flapper is biased by a spring 14 for movement toward the corresponding nozzles 1 and 2.

Figure 3:
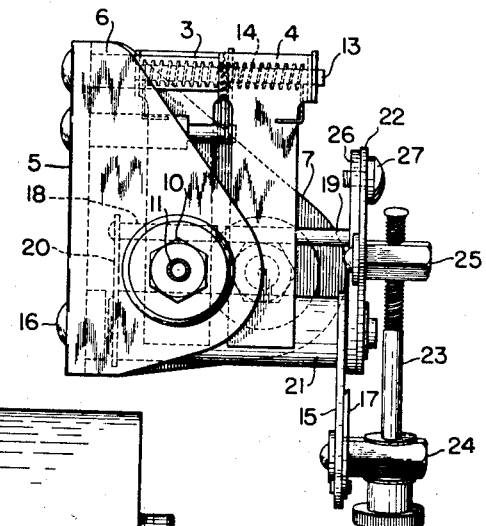
Fig. 3 is an end elevation of the apparatus shown in Fig. 2.
Figure 4:
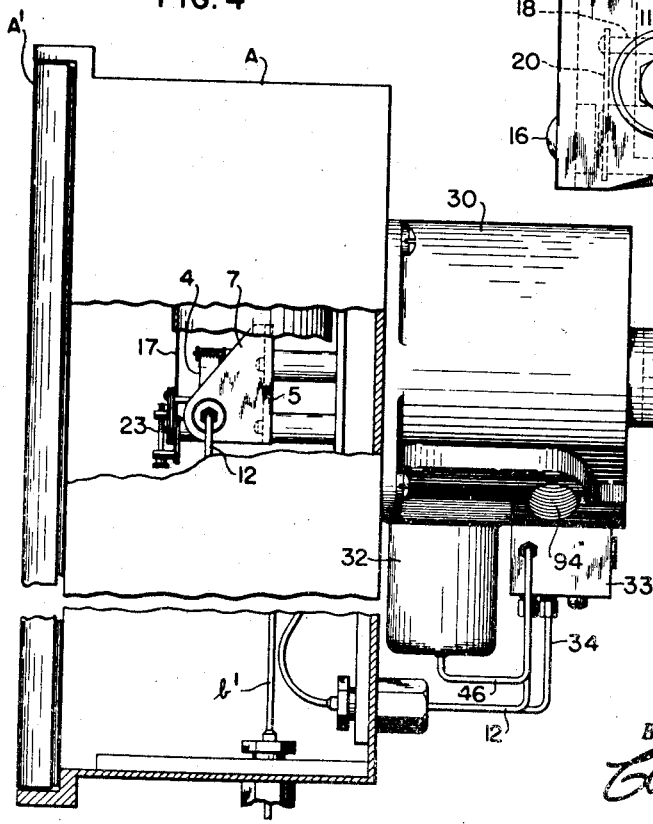
Fig. 4 is a side elevation of the apparatus shown in Fig. 1.

The flappers 3 and 4 are angularly adjusted in accordance with predetremined changes in the angular position of the pen arm $C^2$ and arm D, by means comprising a lever 15 journalled on a post 16 carried by the bracket 5 and connected by a link 17 to the free end of the arm D. The angular adjustments of the lever 15 effect angular adjustments of the flappers 3 and 4 through pins 18 and 19, respectively. In the particular construction shown in Figs. 2 and 3, the pin 18 is carried by an arm 20 secured to the left end of a tubular shaft 21 as seen in Fig. 3. The tubular shaft 21 surrounds and is journalled on the post 16 and is connected at its right end to a plate-like arm 22 supported by shaft 21 and hence angularly adjustable about the post 16. The plate 22 may be angularly adjusted about the axis of the post 16 by the rotation of an adjusting shaft 23 mounted in a bearing part 24 carried by the lever 15. The shaft 23 is rotatably, but not axially movable in the bearing part 24 and is in threaded engagement with a swivel nut 25 pivoted on the part 22. The pin 19 is carried by an arm 26 alongside the plate 22 and pivoted on the tubular shaft 21. The arm 26 may be clamped to the part 22 in any desired angular adjustment by a clamping screw 27 threaded in the arm 26 and extending through a slot 28 in the part 22.

With the construction described, the angular displacement from one another of the flapper actuating pins 18 and 19 may be varied by loosening the clamping screw 27 and angularly adjusting the arm 26 relative to the arm 22. The rotation of the adjusting screw 23 adjusts the arm 22 angularly about the post 16 relative to the lever arm 15. Such relative adjustment of the arms 15 and 24 adjusts the angular relation of the arm 15 and pin 18, and will also adjust the angular relation of the arm 15 and pin 19 when the arm 26 is clamped to the arm 24 by the screw 27. Useful operative results obtainable by the use of the above mentioned adjustments of the operating means for flappers 3 and 4, are hereinafter described.

As shown, the pipes 11 and 12 connected to the nozzles 1 and 2, respectively, extend down into the lower portion of the casing A, and comprise sections anchored in and extending through the back wall of the casing A, and comprise portions outside of the casing connected to an external switch mechanism unit. The latter comprises a box-like housing 30 enclosing electric switches and comprises switch operating bellows elements 31 and 32 which are actuated by the variations in the pressures in the pipes 11 and 12, respectively, and comprises a connector or fitting element 33. The pipes 11 and 12 are connected through the element 33 to the bellows elements 31 and 32, respectively, and are connected through restricted orifices to a pipe 34 supplying air under pressure to the fitting 33. Conveniently and as shown, the switch housing 30 has its back wall bolted against the back wall of the instrument casing A, and the shells of the bellows elements 31 and 32 and the fitting 33 are rigidly connected to the bottom wall of the housing 30. The pipe 34 is connected to and forms a branch of the pipe J' and includes a portion extending through and anchored in the back wall of the instrument casing A.

As shown, the fitting 33 is formed with three horizontal side by side sockets. A filter element 35 is screwed into the center socket, and orifice elements 36 and 37 are screwed into the other two pockets. The elements 35, 36 and 37 are of known construction, which is shown in section, and their use is diagrammatically illustrated in Fig. 8.

As shown in Fig. 8, the filter element 35 comprises a filter 38 formed of cotton or analogous pervious material surrounding a core part 39, and extending across the path of air flowing upward from the subjacent pipe 34 to horizontal channels 40 in the fitting 33, which connect the filter receiving socket to the sockets receiving the elements 36 and 37. The elements 36 and 37 are alike in construction, each being formed with an axial chamber 41. An axially disposed capillary tube 42 extends through the inner end wall of the chamber 41. The tube 42 is smaller in diameter than the chamber 41 in which the major portion of the tube is received. An opening in the side wall of each chamber 41 connects that chamber to the adjacent passage 40. The external end of the capillary tube 42 of device 36, opens into a chamber or space 43 in the fitting 33. The pipe 11 is connected to the chamber 43 and a pipe 44 connects the chamber 43 to the bellows element 31. Similarly, the pipe 42 of element 37, extends into a chamber 45 in the fitting 33. The pipe 12 is connected to the chamber 45 and that chamber is connected by a pipe 46 to the bellows element 32. As shown in Figs. 4 to 7, the pipes 11 and 12 extend into communication with the chambers 43 and 45, respectively, through the bottom wall of the fitting 33, and the pipes 44 and 46 extend into communication with the chambers 43 and 45, respectively, through the end walls of the fitting 33.

The bellows element 31 comprises a shell open at its upper end and a bellows 47 having its open upper end attached to the upper end of said shell and having its lower end closed and movable, and connected to an uprising stem 49. The pipe 44 opens to the space 48 between the bellows and shell of element 31. The stem 49 is thus given longitudinal movements by the contraction and expansion of the bellows 47 produced by decreases and increases in the pressure in the pipe 44. The bellows element 32 is similar in construction to the bellows element 31, and comprises a bellows stem 50 which moves up and down as the pressure in the pipe 12 increases and decreases, respectively.

The bellows stems 49 and 50 extend into the switch housing 30 and coact therein with mercury switches 51 and 52, respectively. As seen in Fig. 5, up and down movements of the stem 49 of the bellows element 31 gives counterclockwise and clockwise adjustments, respectively, to the switch 51, up and down movements of the stem 50 of the bellows element 32 give clockwise and counter- clockwise movements to the switch 52. As shown, the two mercury switches 51 and 52 are similar in type and comprise supporting elements 53 and 54, respectively. Each of the supports 53 and 54 is pivotally mounted on the back wall of the housing 30. As diagrammatically shown in Figs. 8-12, switch 51 comprises a mercury containing envelope with electrodes or terminal contacts 61 and 62 extending into its left end, and electrodes or terminal contacts 63 and 64 in its right end. Mercury in the switch envelope connects the contacts 61 and 62 when the left end of the envelope is below the other end of the envelope, and connects the contacts 63 and 64 when the right end of the envelope is lower than its left end. The switch 52 has a pair of contacts 65 and 66 in the left end of its envelope, and a pair of contacts 67 and 68 in the right end of its envelope. The latter includes mercury which connects contacts 65 and 66, or contacts 67 and 68, accordingly as the envelope is tilted to lower the left or to lower the right end of the envelope.

As shown, the switch housing 30 is formed with a threaded opening 70 in its back wall which is normally closed by an externally threaded disc 72. The rigid outer shells of the bellows elements 31 and 32 are welded to the housing 30. The housing 30 with its removable closure 72 and its rigid bellows shell extensions, is substantially gas tight and of sufficient strength to safely withstand the internal pressure surge due to the explosive ignition of inflammable vapor or gas which may enter the housing as a result of leakage, or sealed in said housing when the closure 72 is put in place. Any explosion occurring within the enclosure will ordinarily not be sufficiently violent to injure the switches 51 and 52, or to injure the bellows members 47, although the effect of the explosion may be to give each bellows 47 its maximum elongation permitted by the shell surrounding it. However, an explosion may be violent enough to ruin the mercury switches or both bellows 47, without igniting an inflammable gaseous atmosphere in which the housing 30 may be enveloped.

As shown diagrammatically in Fig. 8, the mercury switches 51 and 52, actuated by means of the bellows elements 31 and 32 as above described, are employed to jointly control signal devices including a horn 73, a signal lamp 74, and a second signal lamp 75. The horn 73 and lamp 74 are connected in series with one another and with the contacts 61 and 62 of the switch 51 and the contacts 67 and 68 of the switch 52, between the supply conductors 80 and 81. In consequence, the horn 73 and lamp 74 will be energized when the switch 51 occupies its counter-clockwise position and the switch 52 occupies its clockwise position as seen in Fig. 8. In Fig. 8, the lamp 75 is connected in series with the contacts 63 and 64, between the supply conductors 80 and 81, so that the lamp 75 is energized when the switch 51 occupies its counter-clockwise position. In the arrangement shown in Fig. 8, the contacts 65 and 66 are not connected into a signal or other control circuit, and in the Fig. 8 arrangement, the switch 52 might be replaced by a mercury switch including no contacts other than the contacts 67 and 68.

In Fig. 8, $f$ indicates a scale along which the pen arm $C^2$ deflects as the quantity measured by the instrument A varies between a minimum value $fo$ and a maximum value $fs$. The point $fc$ on the scale $f$ may be designated as a control, alarm or normal value point, since the deflection of the pen arm C² past the point *fc* results in an adjustment of at least one of the switch elements 51 and 52 between its clockwise and counter-clockwise positions. The apparatus shown in Fig. 8 may be so adjusted that both or one only of the two switches will be angularly adjusted by a movement of the pen arm C² through the control point *fc*. With the particular adjustment of the apparatus shown in Fig. 8, the relative positions of the pen arm C², nozzles 1 and 2, flapper valves 3 and 4, adjusting pins 18 and 19, and the pivot about which they turn, are such that only the switch 51 will be angularly adjusted as the pen arm C² moves from one side to the other of the control point *fc*.

When the pen arm C² is at the low side of the point *fc* as shown in Fig. 8, the pin 18 holds the flapper 3 away from the nozzle 1 so that the nozzle pressure is too low to contract the bellows 47 of the element 31, and the switch 51 is then in its counter-clockwise position. As the pen arm moves counter-clockwise past the control point *fc*, the resultant movement of the pin 18 permits the flapper 3 to move under its bias force towards the nozzle 1, whereupon the pressure in that nozzle increases as required to shorten the bellows 47 of the element 31 and thereby tilt the switch 51 into its clockwise position. As the pen arm C² turns clockwise, the resultant movement of the pin 19 permits the flapper 4 to approach the nozzle 2, but in Fig. 8, the nozzle 2 is longitudinally adjusted so far to the right that in no position of the pen arm C² is the flapper 4 close enough to the nozzle 2 to make the pressure transmitted to the bellows element 32 large enough to tilt the switch 52 out of its clockwise position.

While with the Fig. 8 arrangement the signal lamp 74 and horn 73 are normally energized only when the pen arm is at the low side of the control point *fc*, they will be energized regardless of the position of the pen arm on any failure of the pipe 34 to supply air at the normal working pressure to the auxiliary air control system. On such failure in the air supply the bellows 47 in each bellows element 31 and 32 assumes its elongated condition, no matter what the corresponding flapper valve adjustment may then be.

As will be apparent, the switches 51 and 52 may be connected in a wide variety of signal or other control circuits, in which use is made of one or both pairs of switch contacts in each switch envelope, as conditions make desirable.

In Figs. 9–12, I have illustrated by way of example, the distinguishing features of four signal control circuit arrangements, each of which differs from each of the others and from the arrangement shown in Fig. 8, though in all of the arrangements use is made of the same switches 51 and 52 and of the same actuating mechanism for these switches.

In the arrangement shown in Fig. 9, a signal lamp 84 is energized when the pen arm C² is within a neutral zone *fn*. When the pen arm is at the high side of the neutral zone, the signal 75 is energized. When the pen is at the low side of the neutral zone, the signals 73 and 74 are energized, and those signals are also energized on a failure in the air supply regardless of the position of the pen arm at that time. With the Fig. 9 arrangement, the signals 73 and 74 are energized when the switch 51 is in its counter-clockwise position; the signal 75 is energized when and only when each of switches 51 and 52 is in its counter-clockwise position, and signal 84 is energized only when switches 51 and 52 are in their clockwise and counter-clockwise positions, respectively.

Ordinarily when the auxiliary control system includes two or more signal lamps, they will be differently colored. Thus in Fig. 9 the lamps 74, 75 and 84 may well be colored red, green and white, respectively. As will be apparent, the longitudinal adjustments of the nozzles 1 and 2 and the angular adjustments of the flapper engaging pins 18 and 19 possible with the apparatus shown, permit of a ready adjustment of either or both limits of the neutral zone of Fig. 9 without interference with the adjustment or operation of measuring apparatus or primary air control apparatus of the instrument.

The arrangement shown in Fig. 10 differs from that shown in Fig. 8, in that the switch contacts 65 and 66 of switch 52 are the only switch contacts included in the energizing circuit of the signal 75, and in that the longitudinal adjustments of the nozzles 1 and 2 are such that the bellows element 31 is inactive at times, whereas bellows element 32 is actuated or inactive accordingly as the pen arm C² is below or above the control point *fc*. In consequence, the signal 75 is energized when the pen arm C² is below the control point and the signals 73 and 74 are energized when the pen arm is above the control point, and also on a failure of the air supply.

In Fig. 11, the single signal circuit includes the signal devices 73 and 74 which are connected in series with one another and with the contacts 61 and 62 of switch 51 and with the contacts 67 and 68 of the switch 52. With the Fig. 11 arrangement, the bellows element 31 is energized or deenergized accordingly as the pen arm C² is above or below the control point *fc*, and it is immaterial whether bellows 32 is deenergized continuously, or only when the pen arm C² is below the control point. In consequence, with the normal air supply, the signals 73 and 74 will be energized when the pen arm C² is below the control point *fc*, but not when the pen arm is above the point *fc*. On a failure of the air supply the signals will be actuated regardless of the pen point position.

In Fig. 12, the energizing circuit for the signals 73 and 74 is the same as it is in Fig. 11. In Fig. 12, however, the nozzle 1 is displaced to the left from its Fig. 11 position, so that the bellows element 31 remains inactive when the pen arm C² goes above the normal or control point, and in Fig. 12, the bellows 32 must be energized or deenergized accordingly as the pen arm C² is below or above the control point *fc*. In consequence, with the normal air supply the signals 73 and 74 are actuated only when the pen arm C² of Fig. 12 is at the high side of its normal position. In the event of a failure of the air supply, the signals 73 and 74 are energized regardless of the position of the pen arm.

To facilitate the connections of the switch contacts into different control circuits, I advantageously provide in the housing 30 a terminal block 85 which may be formed of suitable insulating material, and is provided with a set of terminal connectors 91, each of which may be individually connected to a corresponding one of the switch contacts 61, 62, 63, 64, 65, 66, 67 and 68, respectively. The terminal block 85 is also provided with a set of output terminals 92 alongside the terminals 91. The conductors respectively connected to the different terminals 92 may be included in a cable 93 passing through a suitably sealed opening 94 in the wall of the housing 30. The two terminals of each pair of side by side receiving and output terminals 91 and 92, etc. may be detachably connected by a corresponding bridge conductor 96 which may be removed to disconnect the last mentioned terminals. As shown the terminal block 85 includes baffle portions 95 interposed between adjacent contacts which may have different potentials.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. The combination with a measuring and control instrument including a valve operating member and mechanism responsive to variations in a control condition for adjusting said member in one direction or the other depending on the direction of variation of said condition, an air control mechanism comprising two bleed nozzles and two valves separately associated and cooperating with said bleed nozzles, means through which said member by its adjustment relatively adjusts each bleed nozzle and its associated valve in the direction required to increase or to decrease the air pressure in one, and to respectively decrease or increase the air pressure in the other of said nozzles, the direction of air pressure change in each nozzle being dependent on the direction of said adjustment of said member, a separate fluid pressure motor connected to each nozzle and actuated in one or another direction by an increase or decrease, respectively, in the pressure in the last mentioned nozzle, a separate two position electric switch actuated by each motor, and control means comprising a control circuit jointly controlled by the adjustments of the two switches.

2. A combination as specified in claim 1, in which said air control mechanism includes adjustment means for independently adjusting the means for relatively adjusting each valve and nozzle to thereby vary the relation between the adjustment position of said member and the air pressure in said nozzle.

3. A combination as specified in claim 1, in which each nozzle has an axial discharge orifice at one end, and in which said member relatively adjusts each bleed nozzle and associated valve by moving said valve toward and away from said one end of said nozzle, and in which one at least of said nozzles is longitudinally adjustable.

4. A combination as specified in claim 1, in which each nozzle has an axial discharge orifice at one end, and in which said member relatively adjusts each bleed nozzle and associated valve by moving said valve toward and away from said one end of said nozzle, and in which each of said nozzles is longitudinally adjustable.

5. A combination as specified in claim 1, in which the means through which said member relatively adjusts each nozzle and associated valve, comprises a lever turned about an axis by the adjustment of said member, and in which said lever carries relatively adjustable parts respectively engaging and moving said valves.

6. A combination as specified in claim 1, in which the control means comprises a second control circuit controlled by the adjustment of one only of said switches.

7. A combination as specified in claim 1, in which each of said switches is a mercury switch and in which one at least of said switches comprises one pair of contacts at one end closed when said switch is in one position and a second pair of contacts at its opposite end closed when the switch is in its second position and in which said one pair of contacts is included in said control circuit, and in which said control means includes a second control circuit including said second pair of contacts.

8. An air control unit comprising in combination a support, a pair of bleed nozzles, each mounted in said support for independent longitudinal adjustment relative to said support, a pair of valves each mounted on said support for movement toward and away from a corresponding one of said nozzles to variably obstruct flow through the latter, and a common valve operating member mounted on said support for angular movement relative to said support and comprising two relatively adjustable parts, adapting to respectively engage the two valves and adjust the latter each toward and away from the corresponding nozzle on angular movements of said members which are dependent on the relative adjustments of said parts.

9. An air control unit comprising in combination a support, two parallel bleed nozzles mounted on said support for longitudinal adjustment relative to the latter, two valves respectively cooperating with the two bleed nozzles and each mounted on said support for movement to variably obstruct flow through the cooperating nozzles, and a common valve operating lever pivoted on said support and having separate relatively adjustable engaging parts for respectively engaging the two valves.

10. An air control unit comprising in combination a support, two parallel bleed nozzles mounted on said support for longitudinal adjustment relative to the latter, two valves respectively cooperating with the two bleed nozzles and each mounted on said support for movement to variably obstruct flow through the cooperating nozzles, a common valve operating lever pivoted on said support and having separate engaging parts for respectively engaging the two valves, and means for relatively adjusting said parts.

11. An air control unit comprising in combination a support, a pair of parallel bleed nozzles mounted on said support and having their discharge ends facing in opposite directions, two valves respectively cooperating with the two bleed nozzles and each mounted on said support for movement to variably obstruct flow through the discharge end of the cooperating nozzle, and a common valve operating lever pivoted on said support and adapted by its angular adjustments to separately adjust each valve relative to the discharge end of the corresponding nozzle, said operating lever comprising separate engaging parts for respectively engaging the two valves, and means for relatively adjusting said parts.

12. An air control unit comprising in combination a support, two parallel bleed nozzles mounted on said support for longitudinal adjustment of each relative to said support and having their discharge ends facing in opposite directions, two valves respectively cooperating with the two bleed nozzles and each mounted on said support for movement relative to the discharge end of the cooperating nozzle, and a common valve operating lever pivoted on said support and adapted by its angular adjustments to adjust each valve toward and away from the discharge end of the cooperating nozzle, said lever comprising an actuating arm, separate valve engaging parts for operatively engaging the two valves, and means for separately securing each of said parts to said actuating arm in different positions relative to the latter.

13. An air control unit comprising in combination a support comprising a body portion and two spaced apart projections from one side of said body portion, two parallel bleed nozzles mounted one on each of said projections for longitudinal adjustment, each nozzle having its discharge end in the space between said projections, two valves respectively cooperating with the two bleed nozzles and each mounted on the body portion of said support for movement toward and away from the discharge end of the cooperating nozzle, and a common valve operating lever pivoted on said support and adapted by its angular adjustments to separately adjust each valve relative to the discharge end of the corresponding nozzle, said operating lever comprising separate engaging parts for respectively engaging the two valves, and means for relatively adjusting said parts.

14. The combination with a measuring and control instrument including a valve operating element and means responsive to variations in a variable condition and means for adjusting said element in one direction or the other accordingly as the value of said condition varies in one direction or the other from a predetermined value thereof, an electric switch, a fluid pressure mechanism adapted to actuate said switch in accordance with variations in the pressure transmitted to it, an explosion proof structure enclosing said switch and mechanism, an air control mechanism external to said enclosure and comprising bleed nozzle and flapper valve parts relatively adjusted by said element in selective accordance with the direction of adjustment of the latter, and a conduit connection between said mechanisms for subjecting said fluid pressure operating mechanism to the air pressure variations created by said air control mechanism.

15. The combination with a measuring and control instrument including a valve operating member, mechanism including an element responsive to variations in a variable condition for adjusting said member in one direction or the other accordingly as the value of said condition varies in one direction or the other from a predetermined value thereof, an air control mechanism comprising a pair of bleed nozzles, associated valves relatively adjusted by adjustments of said element and creating pressure variations in opposite directions in the two bleed nozzles in selective accordance with the direction of adjustment of said element, a pair of electric switches, separate fluid pressure actuating motors for the two switches, an explosion proof structure enclosing said switches and motors, conduit means connecting one of said nozzles to one of said motors and connecting the other nozzle to the other motor, and mechanism jointly controlled by said switches.

LOUIS GESS.

REFERENCES CITED

The following references are of record in the file of this patent:

UNITED STATES PATENTS

| Number | Name | Date |
|---|---|---|
| 2,168,307 | Hann et al. | Aug. 8, 1939 |
| 2,202,218 | Mallory | May 28, 1940 |